United States Patent
Anderson et al.

(10) Patent No.: US 6,559,632 B1
(45) Date of Patent: May 6, 2003

(54) METHOD AND APPARATUS FOR DETERMINING LINEAR AND ANGULAR VELOCITY OF A MOVING BODY

(75) Inventors: Theodore R. Anderson, Galway, NY (US); Edward R. Javor, Uncasville, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/548,387

(22) Filed: Apr. 11, 2000

(51) Int. Cl.[7] .............................. G01P 3/44; G01P 3/50
(52) U.S. Cl. ................. 324/174; 324/163; 324/207.12; 324/225
(58) Field of Search ................ 324/160–179, 324/207.12, 225

(56) References Cited

U.S. PATENT DOCUMENTS 3,588,683 A * 6/1971 Lloyd ......................... 324/232
3,783,370 A * 1/1974 Birdwell et al. ............. 324/243
4,185,279 A * 1/1980 Bachman ..................... 340/671
5,111,102 A * 5/1992 Macks ........................ 310/90.5
5,181,020 A * 1/1993 Furukawa et al. ........... 340/551
5,530,298 A * 6/1996 Gerhold ....................... 307/106

* cited by examiner

*Primary Examiner*—Edward Lefkowitz
*Assistant Examiner*—Reena Aurora
(74) *Attorney, Agent, or Firm*—James M. Kasischke; Michael J. McGowan; Michael F. Oglo

(57) ABSTRACT

An apparatus and method for determining linear and angular velocity of a moving body. A magnet is attached or fixed to the body, the velocity of which is to be determined. The apparatus comprises a sensor comprising a core of magnetic material and a coil wound about the core. The movement of the body and magnet relative to the core effects a time-varying magnetic field between the magnet and the core thereby producing Barkhausen effect time-varying voltage signals in the coil. The apparatus further comprises a system for detecting and processing the time-varying voltage signals so as to effect a transformation of the signals into data defining the velocity of the moving body.

6 Claims, 1 Drawing Sheet

METHOD AND APPARATUS FOR DETERMINING LINEAR AND ANGULAR VELOCITY OF A MOVING BODY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention generally relates to a method and system for determining the velocity of a moving body, and more particularly to a method and system for determining the linear and angular velocity of a moving body using the Barkhausen effect.

(2) Description of the Prior Art

Magnetic sensors are commonly used in determining the velocity of moving bodies. Some of the conventional sensors typically used today are Hall Effect sensors, fluxgate sensors, magnetoresistive sensors, magnetostrictive sensors, magnetoinductive sensors and SQUID sensors. However, these devices have several disadvantages. For example, the SQUID sensor can only operate properly at superconductive temperatures. The flip coil magnetometer utilizes moving parts thereby creating problems associated with component malfunction and replacement. Hall Effect sensors, fluxgate sensors, magnetoresistive sensors, magnetostrictive sensors, magnetoinductive sensors all require an external bias or bridge-type circuit for proper operation. What is needed is a sensor that is a passive device and which can operate at room temperature. A further desired feature is that it must be simple in construction in order to reduce the costs related to manufacturing, maintenance and repair.

SUMMARY OF THE INVENTION

Therefore, it is an object of the present invention to provide a system and method for measuring the velocity of a moving body that does not exhibit or present the problems and disadvantages of conventional sensors.

It is another object of the present invention to provide a passive system for measuring the velocity of a moving body.

It is a further object of the present invention to provide a system for measuring the velocity of a moving body that can operate at room temperature.

It is yet another object of the present invention to provide a system for measuring the velocity of a moving body that is relatively less complex in design and construction than conventional systems.

Other objects and advantages of the present invention will be apparent to one of ordinary skill in the art in light of the ensuing description of the present invention.

The present invention is directed to a method and system for determining the rotational (or angular) or linear velocity of a moving body. The system utilizes a Barkhausen Effect magnetic field sensor. In one embodiment, the Barkhausen Effect magnetic field sensor comprises a coil wound about a silicon-steel core. In one embodiment, the coil comprises a predetermined number of turns of magnet wire. A permanent magnet is attached to the body whose motion is to be monitored in order to determine its velocity. As the body moves, the permanent magnet realigns small, atomic size magnetic domains in the silicon-steel core and, as a result of Faradays law, e.m.f. (electromotive force) impulses (also known as "inductive kicks") are produced in the coil. As the velocity of the body increases, a plurality of e.m.f. impulses are created which define a distinct signal. This analog voltage is filtered, amplified and then converted into a digital signal. The digital signal is then fed into other signal processing circuitry that processes the signal to determine the velocity of the moving body.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which like reference numerals refer to like parts and in which:

DESCRIPTION OF THE PREFERRED EMBODIMENT

Figure 1:
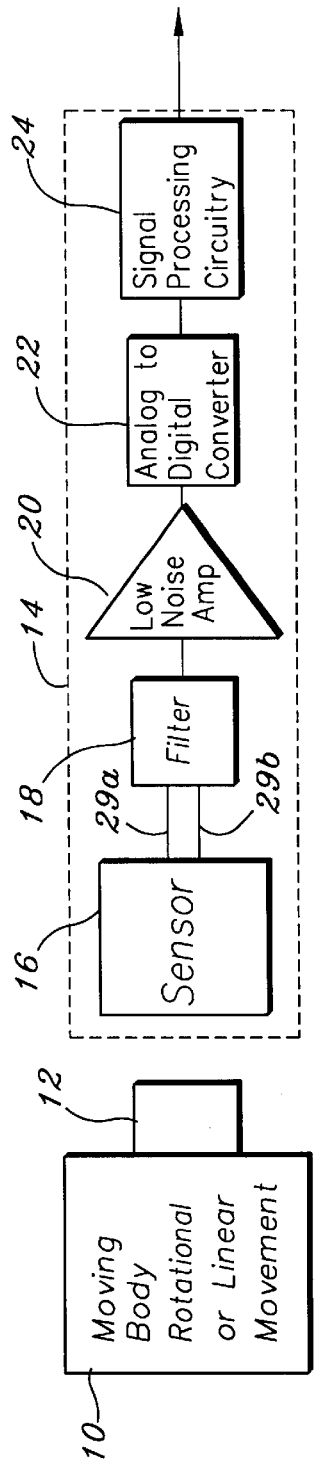
FIG. 1 is a block diagram illustrating the system of the present invention and a moving body, the velocity of which is being measured by the aforementioned system.

The present invention provides a new and improved system and method for accurately determining the rotational (angular) or linear velocity of a moving body. Referring to FIG. 1, there is shown a moving body that is indicated by the numeral 10. Moving body 10 can be a moving gear, moving machinery components, turbines, etc. In accordance with the present invention, magnet 12 is attached to moving body 10. In a preferred embodiment, magnet 12 is a permanent magnet. The purpose of magnet 12 will be discussed in the ensuing description.

Referring to FIG. 1, there is shown system 14 of the present invention. System 14 generally comprises magnetic field sensor 16, filter 18, amplifier 20, analog-to-digital converter (ADC) 22 and signal processing circuitry 24.

Figure 2:
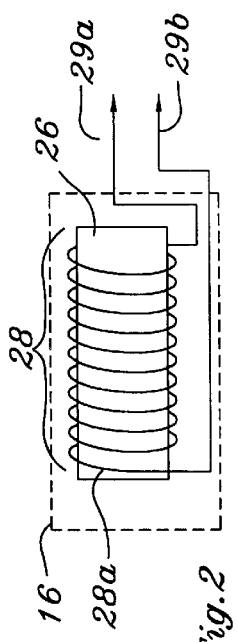
FIG. 2 is a diagram of a Barkhausen Effect Passive Magnetic Field Sensor utilized in the system shown in FIG. 1.

Referring to FIG. 2, in accordance with the present invention, magnetic field sensor 16 is configured as a Barkhausen Effect passive magnetic field sensor. Sensor 16 comprises core 26 and a coil 28 that is wound about core 26. In one embodiment, the coil 28 comprises a plurality of turns of conductor or wire 28a. It is highly preferable that core 26 be fabricated from ferro-magnetic material. In a preferred embodiment, wire 28a is preferably fabricated from tin-coated copper or other well known conductors that exhibit a relatively low resistance per unit of length such as copper, silver or gold. In a preferred embodiment, wire 28a is sized between 24 AWG and 28 AWG, inclusive, and is coated with a substance such as lacquer or varnish. Such a wire configuration is known in the art as "magnet wire". The use of magnet wire, with its thin wall of insulation, reduces the size of coil 28 or size of the volume of sensor 16. In a preferred embodiment, the plurality of turns is between about 2500 and 3500 turns, inclusive.

Referring to FIG. 2, core 26 may be fabricated from a variety of magnetic materials. For example, in one embodiment, core 26 is fabricated from silicon-steel. Other materials can also be used, such as magnesium-zinc ferrite, nickel-zinc ferrite, silicon iron, etc. In a preferred embodiment, magnetic core 26 has a DC permeability (relative) between about 100 and 1000, inclusive.

Referring to FIGS. 1 and 2, as body 10 and magnet 12 move with respect to sensor 16, a time-varying magnetic field is created between magnet 12 and core 26. This magnetic field produces a statistical realignment of the magnetic domains in core 26. Ferromagnetic materials exhibit jumps in magnetization in the presence of an applied magnetic field of increasing strength. This phenomenon is commonly known as the Barkhausen effect. The effect is a result of the motion of domain wall boundaries of the material in response to a fluctuating field. The pattern of jumps gives important information about the material microstructure that is used to characterize photo-optical devices and recording media. Each realignment produces an inductive voltage kick, the sum total of which induces a time-varying voltage (e.m.f.) in wire 28a. This induced voltage is the result of the relationship between induced voltage and time-varying magnetic flux linkage defined by Faraday's Law which may be expressed as the following formula:

$$v = N(d\phi/dt)$$

wherein $v$ is the induced voltage, $\phi$ is the magnetic flux that links the coil, t is time, and N is the number of turns in the coil 28 (i.e., the number of turns of wire 28a around core 26). Thus, the magnitude of the generated flux is related to the permeability of the magnetic material from which core 26 is fabricated, and the magnitude of the induced voltage $v$ is directly proportional to the product of the number of turns N and the change in flux for a particular time interval. Thus, as permeability increases, so will flux linkage and induced voltage.

One important feature and advantage of sensor 16 is that it is passive and does not require an external bias (power supply voltage) or a bridge circuit to operate. Another feature and advantage of sensor. 16 is that it operates at room temperature. Thus, no special environment is required for proper operation of sensor 16.

Referring to FIGS. 1 and 2, ends 29a and 29b of wire 28a are used as inputs to filter 18. Filter 18 filters out extraneous noise signals. In one embodiment, filter 18 comprises a passive noise filter. In another embodiment, filter 18 is configured as a DSP (Digital Signal Processing) filter. In a preferred embodiment, the signal-to-noise (S/N) ratio of filter 18 is at least about 13 dB (decibel). The output of filter 18 is then fed into amplifier 20. In a preferred embodiment, amplifier 20 is a low-noise amplifier. Preferably, amplifier 20 has a noise figure between about 6 dB and 10 db, inclusive. Preferably, amplifier 20 has a 3 dB bandwidth between about 100 Hz and 10 kHz, inclusive. Amplifier 20 may be realized in any one of a variety of configurations, e.g. integrated circuits, discrete components, etc.

Referring to FIG. 1, the output of amplifier 20 is fed into ADC 22. The signal fed into ADC 22 is sampled at a predetermined sampling rate. The sampled signal is converted into a multi-bit digital signal that represents the sampled amplitude. In one embodiment, the sampling rate is between about 50 kHz and 100 kHz, inclusive. The digital signals outputted by ADC 22 are fed into signal processor 24. Signal processor 24 effects real-time manipulation of the digital signals outputted from ADC 22. Such manipulation includes the application of various signal processing algorithms such as FFTs (Fast Fourier Transforms), DFTs (Discrete Fourier Transforms) and algorithms that perform various other operations on the signal data, e.g. interpolation, averaging, etc. Specifically, signal processor 24 uses particular information from the digital signals outputted from ADC 22 such as (i) the magnitude of the signals, (ii) the frequency of signals having particular magnitudes, and (iii) the repetition of certain signal patterns, in order to determine the velocity of moving body 10 and whether the velocity is rotational (angular) or linear. Additionally, system 14 may be calibrated using known rotational or linear velocities. In one embodiment, circuitry 24 includes a memory storage device, such as a random access memory (RAM), to store signal information and the results of all mathematical calculations.

Figure 3:
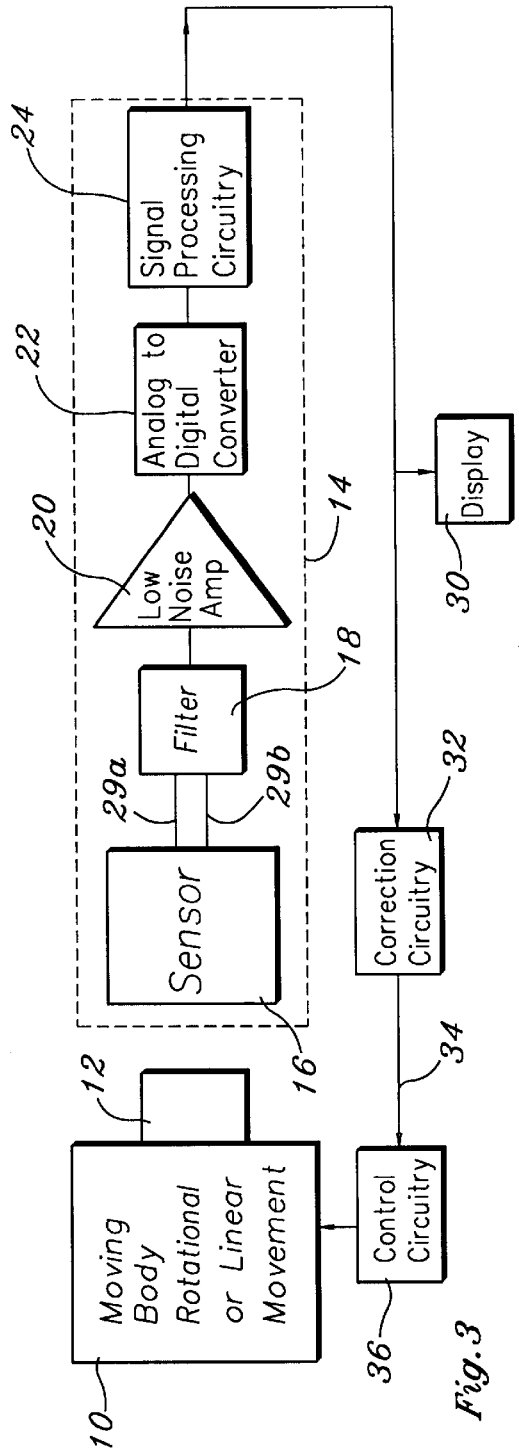
FIG. 3 is a block diagram illustrating a feed back system that utilizes the system of the present invention.

Referring to FIG. 3, in one embodiment, the output of signal processor 24 is fed into display device 30. Display device 30 can be a computer screen, oscilloscope, video monitor, cathode-ray-tube, liquid-crystal-display, etc. Additional driver or buffer circuitry, well known in the art, may be needed to couple the output of signal processor 24 to the input of display device 30 to prevent signal degradation. As shown in FIG. 3, system 10 can also be used to effect a feedback system. In such a feedback system, the output of signal processor 24 is fed into correction circuitry 32 which compares the current velocity of the moving body to a preset, predetermined or desired velocity. Correction circuitry 32 outputs error signal 34 that is fed into control circuitry 36. In response to error signal 34, control circuitry 36 increases, decreases or maintains the velocity of moving body 10.

Thus, the system of the present invention achieves the objects set forth above. Specifically, the system of the present invention:

a) utilizes a sensor that is passive and does not require biasing or bridge circuitry for operation;

b) utilizes a sensor that can properly operate at room temperature;

c) provides accurate and consistent measurements;

d) can be implemented with a variety of hardware and software systems and components; and e) can be implemented at a relatively low cost.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An apparatus for determining linear and angular velocity of a moving body having a magnet attached thereto comprising:

a core of magnetic material;

a coil wound about the core, the movement of the body and magnet relative to the core effecting a time-varying magnetic field between the magnet and the core thereby producing Barkhausen effect time varying voltage signals in the coil;

a filter for filtering extraneous noise signals from the Barkhausen effect time-varying voltage signals;

an amplifier for amplifying the filtered signals; and an analog-to-digital converter for converting the amplified, filtered signals into digital signals;

a processor circuit configured to transform the digital signals into data that defines the velocity of the moving body;

a display for displaying the data;

correction circuitry for producing an error signal that represents the difference between the velocity of the moving-body as defined by the data and a predetermined velocity; and control circuitry for adjusting or maintaining the velocity of the moving boy in accordance with the error signal.

2. The apparatus according to claim 1 wherein the filter comprises a passive filter.

3. The apparatus according to claim 1 wherein the filter comprises a digital signal processing filter.

4. The apparatus according to claim 1 wherein the magnetic material from which the core is fabricated is ferromagnetic material.

5. The apparatus according to claim 1 wherein the magnetic material from which the core is fabricated is silicon-steel.

6. A method for determining a velocity of a moving body comprising the acts of:

attaching a magnet to a body, the velocity of which is to be determined;

providing a core of magnetic material having a coil wound thereabout, the movement of the body and magnet relative to the core effecting a time-varying magnetic field between the magnet and the core thereby producing Barkhausen effect time-varying voltage signals in the coil;

filtering extraneous noise signals from the Barkhausen effect time-varying voltage signals;

amplifying the filtered Barkhausen effect time-varying voltage signals;

converting the amplified signals into digital signals;

processing the digital signals to effect a transformation of the digital signals into data defining the velocity of the moving body;

displaying the data;

producing an error signal that represents the difference between the velocity of the moving body as defined by the data and a predetermined velocity; and adjusting or maintaining the velocity of the moving body in accordance with the error signal.

\* \* \* \* \*